US008176568B2

(12) United States Patent
Jin et al.

(10) Patent No.: US 8,176,568 B2
(45) Date of Patent: May 8, 2012

(54) TRACING TRAITOR COALITIONS AND PREVENTING PIRACY OF DIGITAL CONTENT IN A BROADCAST ENCRYPTION SYSTEM

(75) Inventors: Hongxia Jin, San Jose, CA (US); Jeffrey Bruce Lotspiech, Henderson, NV (US)

(73) Assignee: International Business Machines Corporation, Armonk, NY (US)

( * ) Notice: Subject to any disclaimer, the term of this patent is extended or adjusted under 35 U.S.C. 154(b) by 1180 days.

(21) Appl. No.: 11/323,247

(22) Filed: Dec. 30, 2005

(65) Prior Publication Data

US 2007/0165853 A1      Jul. 19, 2007

(51) Int. Cl.
    G06F 21/00      (2006.01)
(52) U.S. Cl. .............. 726/32; 726/24; 726/26; 713/165; 380/201; 705/57
(58) Field of Classification Search .................. 726/24, 726/26, 32; 380/201
    See application file for complete search history.

(56) References Cited

U.S. PATENT DOCUMENTS

| | | | |
|---|---|---|---|
| 6,760,445 B1 | 7/2004 | Schwenk et al. | |
| 6,901,515 B1 * | 5/2005 | Muratani | 713/176 |
| 7,017,043 B1 * | 3/2006 | Potkonjak | 713/176 |
| 7,212,634 B2 * | 5/2007 | Briscoe | 380/203 |
| 7,346,777 B2 * | 3/2008 | Muratani | 713/176 |
| 7,382,905 B2 * | 6/2008 | Venkatesan et al. | 382/124 |
| 7,814,564 B2 * | 10/2010 | He et al. | 726/32 |
| 2002/0129247 A1 * | 9/2002 | Jablon | 713/169 |
| 2002/0133701 A1 * | 9/2002 | Lotspiech et al. | 713/163 |
| 2002/0141582 A1 * | 10/2002 | Kocher et al. | 380/201 |
| 2003/0009671 A1 * | 1/2003 | Yacobi et al. | 713/176 |
| 2003/0188168 A1 * | 10/2003 | Muratani | 713/176 |
| 2004/0111611 A1 * | 6/2004 | Jin et al. | 713/163 |
| 2005/0254644 A1 * | 11/2005 | Patarin | 380/28 |
| 2006/0153377 A1 * | 7/2006 | Arditti Modiano | 380/200 |
| 2006/0239501 A1 * | 10/2006 | Petrovic et al. | 382/100 |
| 2008/0228650 A1 * | 9/2008 | Cochran et al. | 705/59 |

OTHER PUBLICATIONS

Pfitzmann, Trials of Traced Traitors, Workshop of Information Hiding, Cambridge, UK 30.5-1.6.1996, Springer-Verlag.*
Fial et al. "Dynamic Traitor Tracing", Journal of Cryptology, Pub. Apr. 2001, vol. 14, No. 3, 211-223, DOI: 10.1007/s00145-001-0006-7.*
Jin et al, "Traitor Tracing for Prerecorded and Recordable Media", DRM'04, Oct. 25, 2004, Washington, DC, USA.*
U.S. Appl. No. 09/770,877, filed Jan. 26, 2001.
U.S. Appl. No. 09/771,239, filed Jan. 26, 2001.

(Continued)

*Primary Examiner* — Taghi Arani
*Assistant Examiner* — Morshed Mehedi
(74) *Attorney, Agent, or Firm* — Marc D. McSwain; Leonard T. Guzman; Mohammed Kashef

(57) ABSTRACT

A system, method, and computer program product to find coalitions of receivers who collude to produce pirated protected content, then evaluates the confidence that particular members of each identified coalition are traitors versus innocent receivers incriminated by chance. Typically, each file in a group of original files is modified to include variations of critical file segments. The group of files is then broadcast with individualized codes that enable particular authorized receivers to properly process the modified files. The modifications in a pirated version of a file can identify which traitorous receivers contributed to its piracy. Candidate coalitions of differing size are first evaluated to determine if they cover observed file variations with greater than a predetermined likelihood that an innocent coalition is falsely incriminated by chance. Individual members of satisfactory coalitions are then evaluated. Traitors may be cryptographically revoked.

30 Claims, 10 Drawing Sheets

```
Procedure "Cover"

inputs:
k = number of symbols that would uniquely identify a single player,
T = number of suspected traitors,
list of encoded symbols discovered in recovered file if T*k > # of symbols then
  print "MANY"
  return TRUE
else
  calculate MIN=ceiling((length(symbols)/T)
  for each combination of k symbols:
    if one player assigned to the combination covers 'MIN' symbols then
      if T=1 then
        print PLAYER ID
        return TRUE
      endif
      if T>1 then
        call procedure COVER, T=T-1, all symbols removed from suspect player
        if COVER returns FALSE then
          goto 10
        endif
        if COVER returns TRUE then
          print PLAYER ID
          return TRUE
        endif
      endif
10  CONTINUE
  endfor
  return FALSE
endif
```

OTHER PUBLICATIONS

U.S. Appl. No. 09/777,506, filed Feb. 5, 2001.
U.S. Appl. No. 09/789,451, filed Feb. 20, 2001.
U.S. Appl. No. 10/042,652, filed Jan. 8, 2002.
U.S. Appl. No. 10/315,395, filed Dec. 9, 2002.

* cited by examiner

FIG. 8 Procedure "Cover"

inputs:
k = number of symbols that would uniquely identify a single player,
T = number of suspected traitors,
list of encoded symbols discovered in recovered file

```
if T*k > # of symbols then
   print "MANY"
   return TRUE
else
   calculate MIN=ceiling((length(symbols)/T)
   for each combination of k symbols:
      if one player assigned to the combination covers 'MIN' symbols then
         if T=1 then
            print PLAYER ID
            return TRUE
         endif
         if T>1 then
            call procedure COVER, T=T-1, all symbols removed from suspect player
            if COVER returns FALSE then
               goto 10
            endif
            if COVER returns TRUE then
               print PLAYER ID
               return TRUE
            endif
         endif
10     CONTINUE
   endfor
   return FALSE
endif
```

FIG. 9 main method inputs:
k = number of symbols that would uniquely identify a single player,
T = number of suspected traitors,
list of encoded symbols discovered in recovered file 1. Set T=1
2. call COVER
3. if COVER returns TRUE then EXIT
4. Set T=T+1
5. goto 2

FIG. 10 Procedure "Evaluate Innocence Probability"

inputs:
k = number of symbols that would uniquely identify a single player,
T = number of suspected traitors,
m = number of recovered movies,
N = total population of players,
q = number of different symbols in each movie
list of encoded symbols discovered in recovered file for each combination of k symbols:
   set probinnocent=0 (e.g. temporarily assume all players in the combination are guilty)
   set T' = T - (number of players in this combination)
   set m' = m - # of movies that can be explained by this combination of players
   evaluate numcombs (m', T') = COMBIN(N, T') * (T'/q) * m'
   probinnocent = numcombs (m', T')
   if numcombs (m', T') >1 then
      probinnocent=1
   endif
   output players in combination and probinnocent
endfor

TRACING TRAITOR COALITIONS AND PREVENTING PIRACY OF DIGITAL CONTENT IN A BROADCAST ENCRYPTION SYSTEM

FIELD OF THE INVENTION

This invention relates to preventing piracy of digital content in a broadcast encryption system and more specifically to tracing traitor coalitions and then individual traitors in those coalitions who may be colluding to redistribute such content and/or related decryption keys.

CROSS-REFERENCE TO RELATED APPLICATIONS

This invention is related to several commonly-owned pending U.S. patent applications, each of which is hereby incorporated by reference, including:

U.S. Ser. No. 09/770,877, filed Jan. 26, 2001, entitled "Method for Broadcast Encryption and Key Revocation of Stateless Receivers".

U.S. Ser. No. 09/771,239, filed Jan. 26, 2001, entitled "Method for Tracing Traitor Receivers in a Broadcast Encryption System".

U.S. Ser. No. 09/777,506, filed Feb. 5, 2001, entitled "Method for Assigning Encryption Keys".

U.S. Ser. No. 09/789,451, filed Feb. 20, 2001, entitled "Method for Assigning Encryption Keys".

U.S. Ser. No. 10/042,652, filed Jan. 8, 2002, entitled "Method for Ensuring Content Protection and Subscription Compliance".

U.S. Ser. No. 10/315,395, filed Dec. 9, 2002, entitled "Method for Tracing Traitors and Preventing Piracy of Digital Content in a Broadcast Encryption System".

BACKGROUND OF THE INVENTION

The widespread transition of data from analog format to digital format has exacerbated problems relating to unauthorized copying and redistribution of protected content. Flawless copies of content can be easily produced and distributed via the Internet. This piracy is a major concern and expense for content providers.

Further, a new type of home consumer device for digital content management has been enabled by the advent of inexpensive, large-capacity hard disks. A movie rental box receives digital movies from some inexpensive source of data, usually a broadcast source (whether terrestrial or satellite-based). The movies do not have to be delivered in real time. Instead, they are stored on the hard disk, so that at any moment the hard disk contains, for example, the hundred hottest movies in the rental market. The consumer can simply select a particular movie and hit "play" to begin viewing a movie. The movie rental box periodically calls a clearing center and reports the consumer's content usage for billing purposes; the box may also acquire new decryption keys during this call.

The advantages the box provides to the consumer are obvious: he or she no longer has to go to the video rental store, and perhaps more importantly, does not have to return a rental tape or DVD. The consumer value proposition of movie rental boxes is so compelling it is estimated that there will be 20 million such boxes in the United States within five years.

Content providers need to know what security problems are associated with these boxes, i.e. how can a user get a movie without paying for it? The simple attack of merely disconnecting the box so that it cannot call the clearing center can achieve only a short-lived advantage because the clearing center can simply refuse to provide new decryption keys to such a box. Likewise, the periodic "calling home" makes detection of clone boxes relatively easy. The most serious attack is likely to be the so-called "anonymous" attack, wherein a user or a group of users purchase rental movies from legitimate movie rental boxes that have been instrumented so that the protected content and/or the decryption keys can be captured and redistributed, often over the Internet. This Napster-style attack with movies instead of music is the most urgent concern of the movie studios that are investigating content protection technology.

One solution to the problem is to differently watermark and differently encrypt each movie for each authorized movie rental box, so that if a movie were pirated the watermarking and encryption information would uniquely identify the compromised box. Alas, this solution is not feasible because of the excessive computing effort and transmission bandwidth required to prepare and transmit individualized movies. The distribution system is economical only if the movies can be distributed over broadcast channels, i.e. where every box gets substantially the same data at the same time.

To solve the broadcast problem, the approach known in the art as "tracing traitors" is used. In this approach, an original version of each movie file has been augmented before being broadcast. Specifically, the file that is actually broadcast has had at least one critical file segment replaced by a set of segment variations. Each file segment variation is differently encrypted and preferably also differently watermarked prior to encryption, although the entire file may be watermarked as well. All the variations in one segment are identical for viewing purposes. A receiver is given the cryptographic key to decrypt only one of the variations in each segment. If the receiver is compromised and is used to illegally rebroadcast either the keys or the segments themselves, it is possible to deduce which receiver or receivers have been compromised.

The traitor tracing approach has not been widely used in practice to date, because previously known methods required unreasonable amounts of bandwidth in the broadcast, due to the number of segments or variations required. This limitation is addressed by the invention "Method for Tracing Traitors and Preventing Piracy of Digital Content in a Broadcast Encryption Medium", U.S. Ser. No. 10/315,395, filed on Dec. 9, 2002 and published Jun. 10, 2004 as U.S. Patent Application Publication 2004/0111611A1. This invention, referred to hereafter as the '395 invention, substantially reduces the bandwidth required. FIGS. 1 through 7 and related description are taken directly from the '395 invention specification. The present invention is perhaps better understood in view of the '395 invention, but is not limited to use with that invention.

Referring now to FIG. 1, a prior art diagram of an original file 100 is shown. Files may comprise any kind of digital data sequence, including but not limited to text, audio, images, video, music, movies, multimedia presentations, operating systems, software applications, and cryptographic keys. In broad terms, file 100 includes a beginning 102 and an end 104 and a span of data. Files 100 may be of any size and may be distributed by any means, including but not limited to computer networks, satellite networks, cable networks, television transmissions, and various physical storage media (e.g. CD-ROMs, DVDs, tapes, etc.) as are known in the art. Files 100 may be broadcast in groups in a substantially continuous sequence, for example, when a movie rental box's stored content of say 255 movies is updated, perhaps on a monthly basis. In the movie rental box scenario, among others, files are usually not encrypted and otherwise processed on the fly, but are processed ahead of time.

The '395 invention is not limited to the movie rental box implementation, but instead can be applied to any digital content subject to one-to-many distribution. For example, operators of a web server (generally referred to as a digital rights manager) that sells copyrighted content such as music or other material stored in a subscription database may not want to encrypt or otherwise process files on the fly because of the computational expense involved. Similarly, such a server cannot feasibly individually tailor nor store a complete copy of every file it transmits.

Another application of the '395 invention is to prerecorded optical discs (DVDs). In fact, the '395 invention has been adopted by the Advanced Access Content System, the content protection system for the new generation of high-definition (blue laser) DVDs. In this case, AACS anticipates 1 billion devices being manufactured incorporating this invention over the life of the technology.

Referring now to FIG. 2, a prior art diagram of critical file segments 202, 204, and 206 in an original file are shown. For clarity, only three critical file segments are shown; the preferred number is approximately 15. Not all data in a file 100 needs to be protected to the maximum possible level of security; bandwidth can be conserved by selectively applying different levels of security to the most valuable portions of a file 100. For example, in terms of the movie rental box scenario, each movie may have scenes that are each absolutely essential for the movie to be acceptable to any audience. All critical file segments in a file must therefore be properly processed for the file to be commercially desirable. The '395 invention preferably selects five-second scenes in a typical movie as critical file segments, but critical file segments of varying length are also encompassed by the '395 invention. The critical file segments are not necessarily equally distributed throughout a given file, in fact the critical file segments are preferably especially selected based on the contents of the file, possibly by human editors. In the case of executable software files, automated tools may identify critical file segments according to a measured execution frequency.

Referring now to FIGS. 3A, 3B and 3C, prior art diagrams of file segment variations 302-324 that replace critical file segments 202-206 are shown. For clarity, only four file segment variations are shown for each critical file segment; the preferred number is approximately 16. Each file segment variation is simply a copy of the particular corresponding critical file segment that has been differently watermarked and differently encrypted. Each entire file is also typically watermarked and encrypted in a broadcast encryption system. Each file segment variation is identified by a text designation in this application (e.g. A, B, C . . . etc.) for clarity, but in practice binary numbers are generally employed for this purpose.

The number of critical file segments and the number of file segment variations preferably employed depends on the properties of the file and its audience. For movies, one could select a single critical file segment and have several hundred file segment variations; however, attackers might simply choose to omit that single critical file segment in a pirated copy of the file, in hopes that viewers would not find such a glitch to be overly annoying. A pirated movie with say 15 missing critical 5-second scenes is probably going to be too annoying to any viewer for it to be of any commercial value. Thus, the illegally broadcast movies are either substantially disrupted or the attackers must incorporate some of their file segment variations, which will facilitate traitor tracing.

While the number of critical file segments and the number of file segment variations may be kept constant for each file, modifying either number according to an estimated piracy likelihood for a given file is also within the scope of the '395 invention. The number of file segments and the number of file segment variations will determine the amount of bandwidth overhead (or, alternately, the increased size of the broadcast version of the file). In a typical movie, use of 15 critical file segments each having 16 file segment variations each of 5 seconds' duration adds roughly 10% to the file size.

Referring now to FIG. 4, a prior art diagram of an augmented file 400 including file segment variations 302-324 is shown. The augmented file 400 is the version of the original file 100 that will actually be broadcast. Each intended receiver of the broadcast of a group of files requires augmentation selection information to choose a particular combination of file segment variations for each particular file. In terms of the movie rental box scenario, each movie rental box must know, for each movie, which set of variations to plug into the spaces where critical scenes existed in the original movie. The particular arrangement of unmodified file content and file segment variations within the augmented file 400 shown is not critical but is merely intuitive.

The augmentations employed by the '395 invention facilitate traitor tracing in a commercially viable (i.e. low bandwidth overhead) manner. If a pirated version of a file is found, say on the Internet, the identity of the particular movie rental box (or boxes) that were used to create the pirated version is of keen interest to the broadcaster and/or content creator (e.g. copyright owners). The broadcaster and/or content creator may institute legal proceedings against the culprit, and would certainly want to refuse to send new decryption keys to the compromised boxes to prevent future thievery. If different boxes are assigned different combinations of file segment variations to use, an analysis of a pirated file can help determine which boxes were used as part of an anonymous attack.

In the event that all of the file segment variations in a redistributed version of a file match the combination of file segment variations assigned to only a single movie rental box, prior art systems would normally identify that box as being the source of the redistributed file. However, attackers are becoming increasingly sophisticated and may choose to employ a number of boxes to produce a pirated version of a file via collusion, wherein each box contributes some information or content used to produce the illicit copy after enough such information or content has been accumulated. From the attackers' point of view, the ideal situation is if they redistribute movies including variations such that an innocent third party appears to be the culprit. Such redistribution may not occur right away, but may follow a so-called "delayed attack". This complicates the task of traitor tracing, and emphasizes the need to prevent all attacks as much as possible for every broadcast. In the '395 invention, the watermarks in the file segment variations are used to determine which variations have been rebroadcast.

Therefore, the '395 invention performs two complimentary tasks: choosing which file segment variation to employ at each critical file segment of each file for each receiver box, and upon observing a redistributed file or decryption keys, identifying (and preferably subsequently disabling) traitors with the assistance of variation assignment information. The '395 invention can detect a larger number of colluding attackers for a given bandwidth than any known solution. It is literally an order of magnitude better than some naive schemes that have been suggested.

Referring now to FIG. 5, a prior art flowchart of the method of assigning super codes is shown. The super codes serve both as augmentation selection information to enable proper processing of files, and as traitor tracing information. The super codes preferably comprise an inner code and an outer code that operate in a nested manner. In step 502 a maximally different inner code codeword is created for each critical file segment variation in each file, as described in more detail below. An inner code codeword describes which combinations of file segment variations should be selected by a particular receiver. Note that at this point the exact location of each critical file segment in each file and its contents may not have been determined, though codewords are selected. Then, in step 504 each file in a group of files is assigned a file identifier according to a maximally different outer code codeword, also to be described below. An outer code describes which inner code codeword is pertinent to a given receiver in each file. The inner code and the outer code are selected (by error correcting codes, preferably Reed-Solomon codes) to each be maximally different, to reduce the likelihood of a group of receivers having identical augmentation selection information. Each group of files typically has a different super code.

The assignment of inner codes may vary randomly so that the pattern of file segment variations employed is not repeated from one broadcast to the next. Similarly, the assignment of outer codes in each broadcast may also vary randomly so that the pattern of files identified in a group is not repeated from one broadcast to the next. Alternately, the assignment of inner code and outer code may be varied according to the need to identify suspected traitor receivers as certainly as possible. Further, while the number of critical file segments and file segment variations may be kept constant for simplicity, the number of critical file segments and the number of file segment variations may be varied according to an estimate of how likely it is that a given file will be pirated.

Referring now to FIG. 6, a prior art flowchart of the method of preparing files for transmission is shown. For each file, at least one critical file segment (as shown in FIG. 2) is selected in step 600. For each critical file segment, at least one file segment variation (as shown in FIGS. 3A, 3B, and 3C) is created in step 602 to replace each critical file segment, forming an augmented file (as shown in FIG. 4). In step 604, the group of augmented files is broadcast. Finally in step 606, each group of files is assigned to one receiver box via a super code and a new set of decryption keys provided to the authorized receivers. The super code determines the assignment of decryption keys to each receiver, i.e. each receiver acquires decryption keys only for the particular file segment variations that will be used by that receiver.

The '395 invention treats the assignment of variations as a coding problem, instead of merely randomly choosing the variations for each box. In other words, when assigning error correcting codes one wants each codeword to be maximally different from every other codeword. Unfortunately, some error correcting codes are impractical because they require many more variations than are allowed by the real-world available bandwidth constraints. The '395 invention avoids the bandwidth problem by having a small number of variations at any single point by nesting two small codes to form an overall or super code. Combinations of file segment variations in each file are assigned according to an inner code. In terms of the text labels describing the file segment variations 302-324 in this application, the inner code that describes which file segment variations in augmented file 400 might be <AFL> for example, indicating that file segment variation 302 should be selected instead of file segment variations 304, 306, and 308, that file segment variation 312 should be selected instead of file segment variations 310, 314, and 316, and that file segment variation 324 should be selected instead of file segment variations 318, 320, and 322.

A file identifier that describes which combination corresponds to which file in a group of files is assigned according to an outer code. For example, the inner code <AFL> might apply to file number 123. The '395 invention preferably employs Reed-Solomon codes, but all coding methods are within the scope of the '395 invention.

For example, using a Reed-Solomon inner code for 15 critical file segments each having 16 file segment variations, there are 256 different codewords assigned to boxes. Because of the properties of the code, that means that if one picks any two boxes, the boxes will either have an identical assignment of file segment variations, or at least 14 out of the 15 points will have different variations.

Using a Reed-Solomon outer code for a group of 255 files, for example, there are 256 different codewords assigned to file identifiers. Thus, if there are 16 million boxes, each assigned to a unique super code, each box will have the same inner code assignment in at most two files. Any two boxes will differ in the inner code assignment in at least 253 files, and in each one of those, they will have at least 14 different points, so the difference between the two boxes spans at least 253×14 or 3542 variations.

Referring now to FIG. 7, a prior art flowchart of the method of identifying and disabling traitor receivers is shown. First, in step 700, a redistributed or pirate version of a file is examined to determine its augmentations, which include the particular file segment variations it contains. Next, in step 702, a comparison is made between the augmentations and the super codes previously assigned to authorized receivers, to determine which receiver (or receivers) are most likely compromised. Finally, in step 704, when a traitor is traced, the dynamic subset of users authorized to receive the broadcast is changed by simply dropping the traced traitor from it; legal action may also be instituted at this point.

The examination includes calculating, preferably for each box, the number of file segment variations that a box matches with each observed illicit file. The examination can reveal a single movie rental box having every assigned file segment variation that was used in the pirated movie and reveal that the watermarks used also match, for a deterministic identification of the traitor. While prior art systems try to determine the traitor as quickly as possible by analyzing a single file, in the case where attackers are colluding this approach doesn't adequately distinguish the culprits. Instead, with the super code design of the '395 invention there may be thousands of boxes that will have exactly the same variations for a given file (as determined by the inner code), but these boxes will be distinguished in subsequent movies via the outer code. Since an attack is only economically hurtful if the attackers rebroadcast many movies, the approach is exactly right. A single group of movies, corresponding to a single super code, can be sufficient to identify a group of colluding traitors.

Further, the comparison may include a count of the number of watermarked file segment variations in the pirated file corresponding to each box among a number of boxes collectively compromised by colluding attackers. A ranked list of boxes can be generated according to the number of each box's file segment variations used in the pirated file. The box that has the most matchings with the redistributed movie is incriminated, and will not be given any new decryption keys. In other words, a list of suspected traitors can be generated according to the number of file segment variations from each that are used in an illicit copy. Thus, even when the suspected traitor numbers become too big for a deterministic identification, the '395 invention can probabilistically identify and disable the compromised box without harming innocent users. The present invention is a substantial improvement on this probabilistic identification.

It is also within the scope of the '395 invention to exclude more than one box for each super code sequence. In other words, the broadcaster can exclude the top two boxes, or the top three boxes, etc. This defeats the attack sooner, but at the cost of increasing the chance of falsely incriminating an innocent device along the way. Of course, there might be non-technical ways to help tell the difference between innocent and colluding boxes. For example, if a consumer calls to complain that her box no longer works, and is willing to have a service man come to her house to fix it, she is likely to be innocent.

The method is repeated for the next super code group of files, e.g. the next group of 255 movies. Eventually the attack will stop because all compromised boxes will have been excluded.

The attackers should not be able to calculate the actual assignments for any boxes but their own; if they could, that might help them incriminate an innocent box. Therefore, an additional feature of the '395 invention is to randomly permute code assignments at each code position (each critical file segment in the movie), and in each movie itself. For example, if a Reed-Solomon code would suggest that a given box should get variation #1 at a certain point in a certain movie, the assignment of variation number to the actual broadcast order will have been permuted, so that variation #1 is rarely the first variation broadcast.

If there are a large number of colluding boxes (e.g. dozens), it may be difficult to condemn any single box after the first 255 movies have been broadcast. It is a simple matter to continue the process with the next group of movies. However, it is probably a bad idea to make exactly the same assignment of boxes to codes in the new group of movies, because then the same innocent box will have a high overlap with the traitors. It is an additional feature of the '395 invention to change the assignment of the super code to boxes after each super code sequence. All such new assignments are within the scope of the '395 invention, including random assignments and code assignments that are calculated to correspond to particular boxes to more effectively identify suspected traitors.

The best super code is generated when the inner code has k=2. This well-known parameter of error correcting codes determines the number of codewords; if q is the number of variations at each point, the number of codewords is $q^k$. All values of the k parameter are nonetheless within the scope of the '395 invention.

The various traitor tracing schemes envisioned in the past have all focused on evaluating the likelihood that particular individual receivers are traitors, typically by computing a score based on the number of file variations that are in common with recovered pirated content files. Numerous simulations have revealed that this prior art "high score" method has flaws: completely innocent receivers often obtain high scores due to chance alone.

It is not hard to see why this is the case. Take, for example, the case of twenty pirate files recovered from a coalition of four receivers, with each file having one of 256 variations. The highest scored receiver must have a score of at least "5", meaning it has at least 5 variations in common with the recovered sequence of files. The problem is, assuming there are 1 billion receivers in the world, on average 15 innocent receivers would score "5" or better on a completely random sequence of movies. Thus, in this attack, the prior art "high score" method would almost never reliably incriminate even one of the actual guilty receivers. This method would also never reveal the actual number of receivers involved in the attack.

Thus, an improved method to reliably detect guilty receivers is therefore needed. In addition, since in real world scenarios the actual number of attackers is rarely known to the licensing agency, a method that could deduce the actual number of receivers involved is highly desirable.

SUMMARY OF THE INVENTION

It is accordingly an object of this invention to provide a method, system, and program product for improving traitor tracing on distributed files in a broadcast encryption system to prevent piracy. Distribution generally includes preparing files for transmission, broadcasting files, and receiving and preparing files for authorized use. Distribution means may include computer networks, satellite networks, cable networks, television transmissions, and physical storage media. Files may comprise any kind of digital data sequence, including but not limited to text, audio, images, video, music, movies, multimedia presentations, operating systems, video games, software applications, and cryptographic keys.

It is a related object of the invention to provide a method of determining if candidate coalitions of colluding attackers can cover observed cryptographic variations and/or augmentations in a redistributed version of a file. The file variations may use a two-level code, with the inner code used within a single file and the outer code used for a sequence of files.

The invention finds entire coalitions rather than single receivers. Innocent coalitions are actually much less likely than innocent single receivers, even though there are many more of them. For example, in the 20-file attack described previously, the chance that a random sequence of 20 files would look like it came from a coalition of size four is less than 4%. This is true even though there are roughly 50 million billion billion billion ($5 \times 10^{34}$) such coalitions! The present invention finds the coalition of size four, and deduces with at least 96% confidence that this was not an innocent coalition incriminated by chance alone.

The invention computes a minimum number k of file variations that would uniquely identify a single receiver, and if the product of k and coalition size T is greater than the number of file variations, then many satisfactory candidate coalitions exist. The invention calculates a minimum number of variations that the most likely traitor must have, then for each combination of k possible file variations the invention determines if a particular receiver assigned to that combination covers the minimum number of variations. If there is only one receiver in the candidate coalition, then it is identified. If there is more than one receiver in the candidate coalition, then the invention removes all the covered file variations from each receiver in the coalition, decreases coalition size T by one, and recursively checks the remaining file variations for additional traitors.

It is a related object of the invention to identify traitorous receivers who redistribute files without authorization in order to disable such traitors to prevent similar redistribution in the future. Legal action may be taken against identified traitors, and traitors may be excluded from the list of receivers for whom new decryption keys are created and subsequently broadcast, i.e. that set of receivers is cryptographically disabled.

The foregoing objects are believed to be satisfied by the embodiment of the present invention as described below.

BRIEF DESCRIPTION OF THE DRAWINGS

FIG. 8 is a cover procedure, according to an embodiment of the present invention.

FIG. 9 is a procedure, according to an embodiment of the present invention.

FIG. 10 is a procedure for calculating the probable innocence of individual coalition members, according to an embodiment of the present invention.

DETAILED DESCRIPTION OF THE INVENTION

Figure 1:
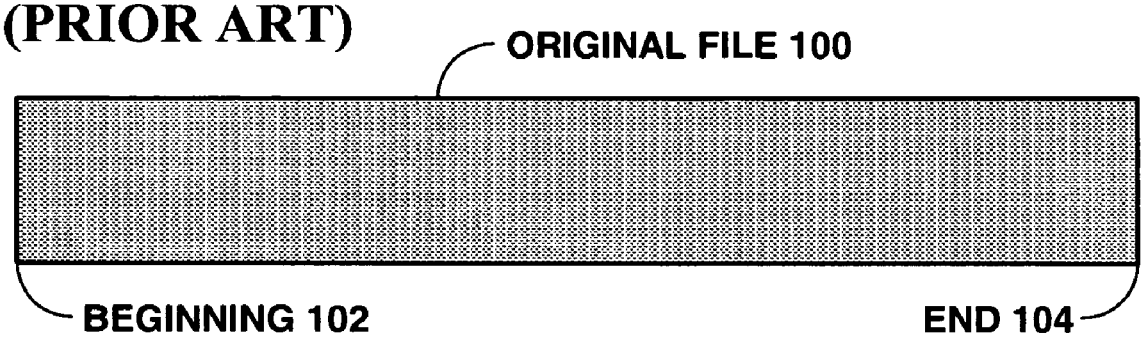
FIG. 1 is a prior art diagram of an original file.
Figure 2:
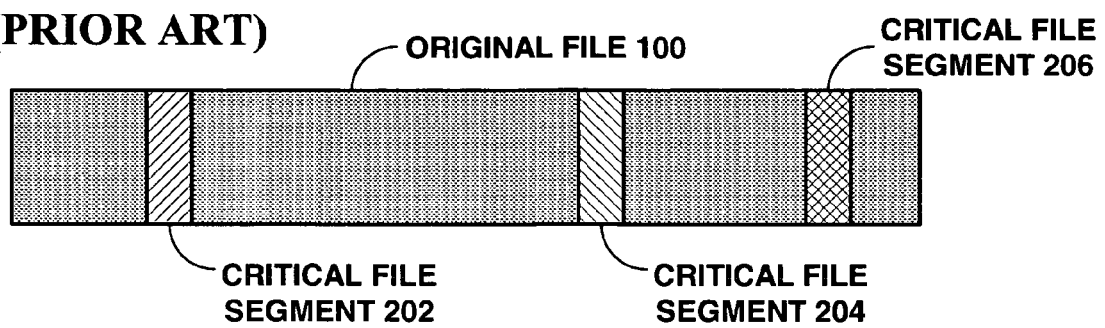
FIG. 2 is a prior art diagram of critical file segments in an original file.
Figure 3A:
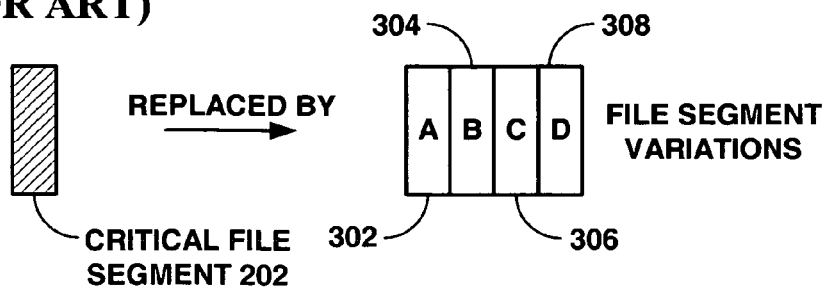
FIGS. 3A, 3B, and 3C are prior art diagrams of file segment variations that will replace critical file segments.
Figure 3B:
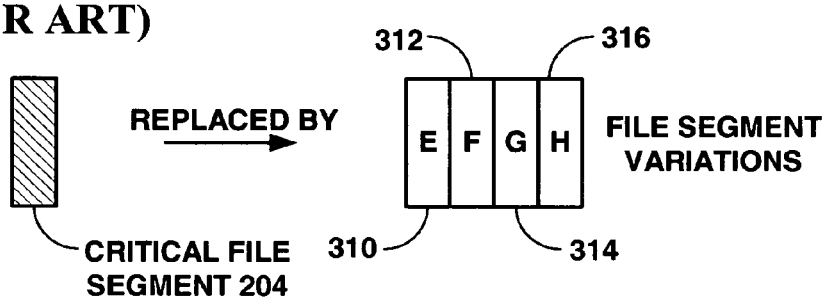
Figure 3C:
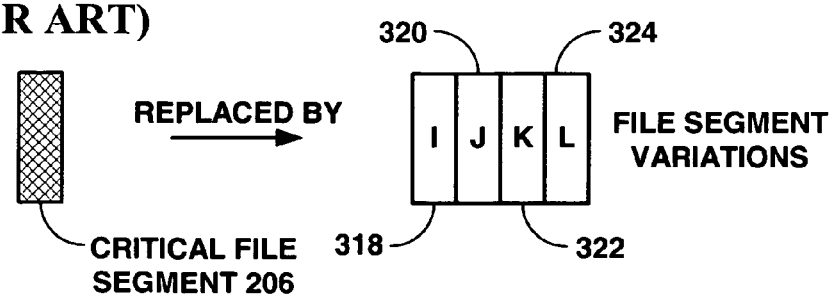
Figure 4:
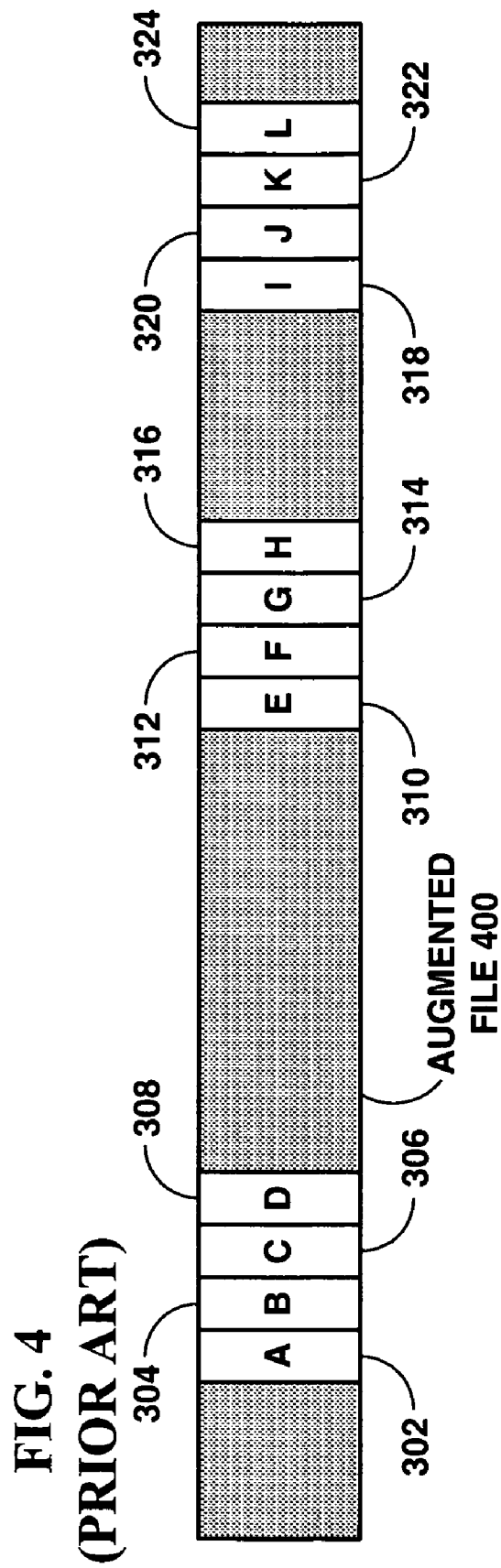
FIG. 4 is a prior art diagram of an augmented version of a file including file segment variations.
Figure 5:
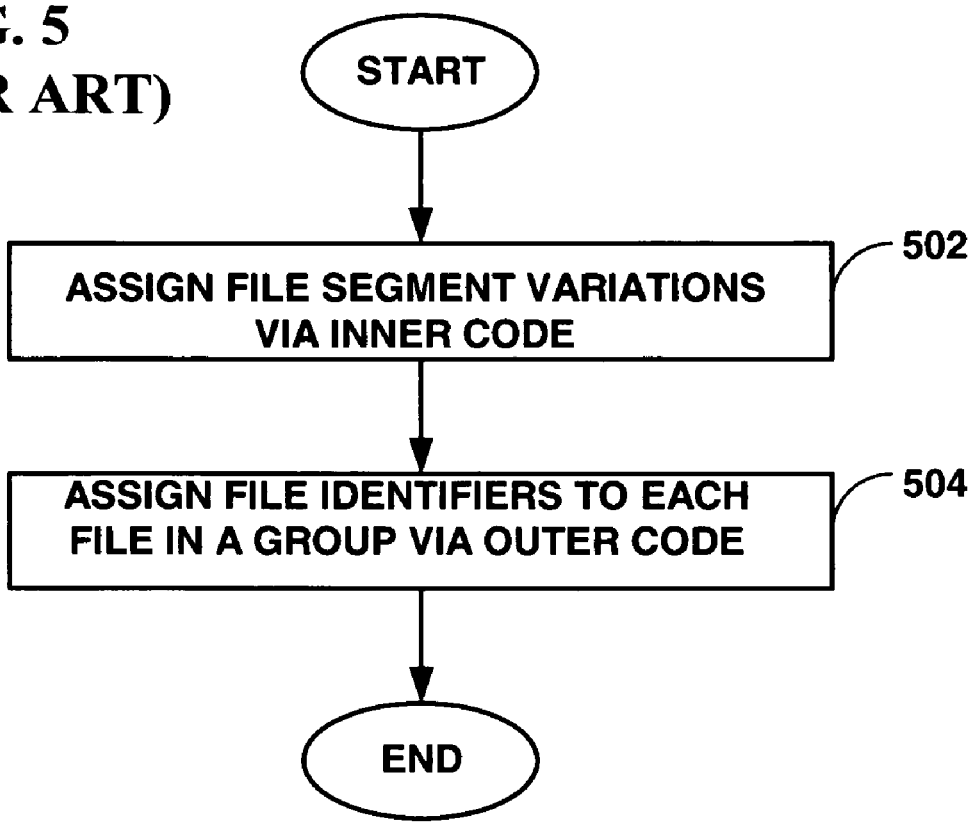
FIG. 5 is a prior art flowchart of the method of assigning super codes.
Figure 6:
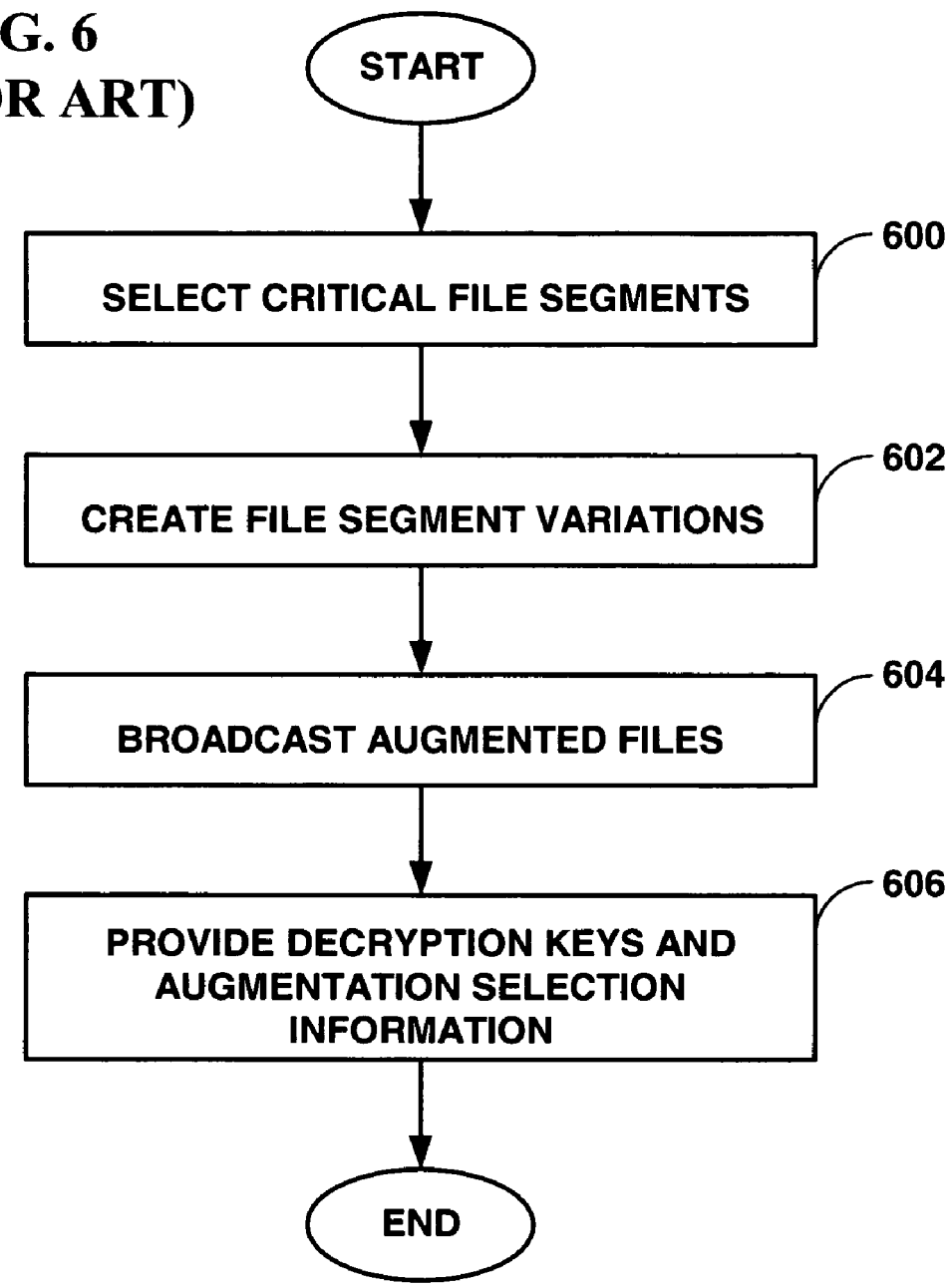
FIG. 6 is a prior art flowchart of the method of preparing files for transmission.
Figure 7:
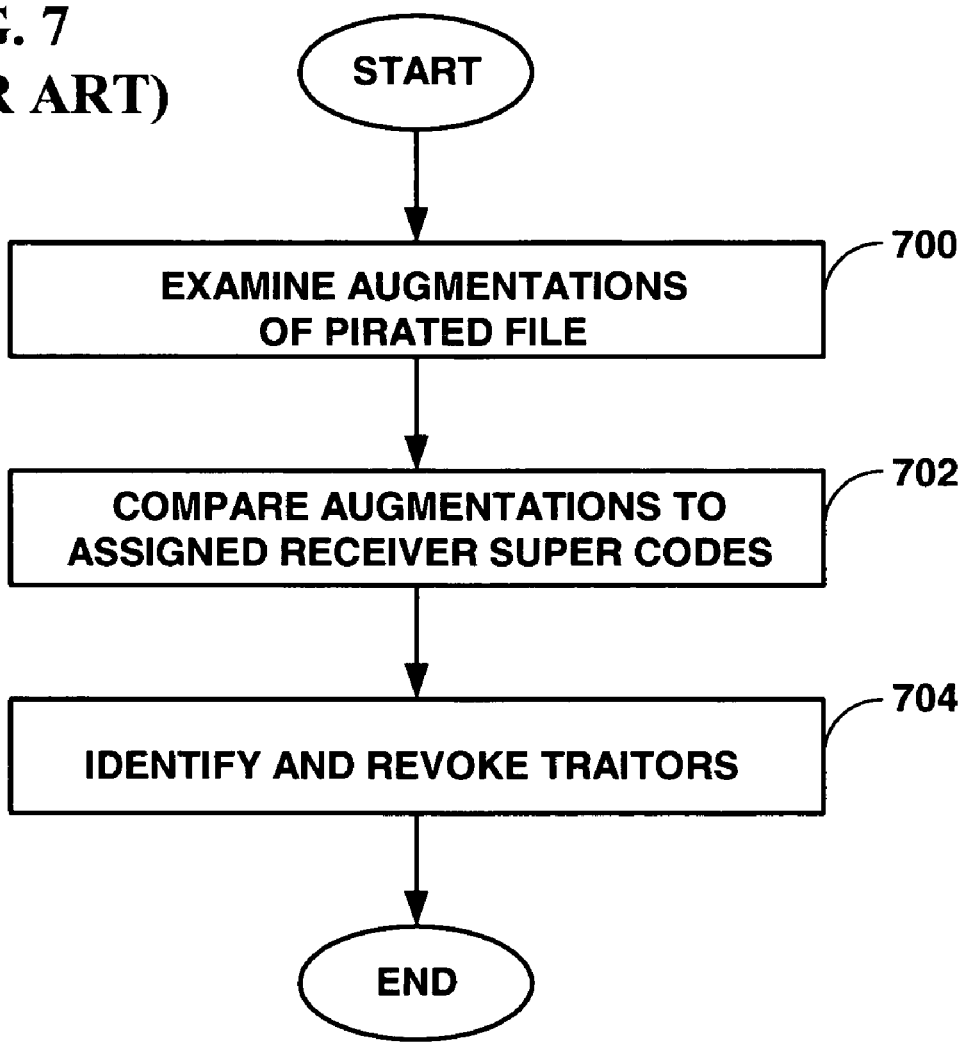
FIG. 7 is a prior art flowchart of the method of identifying and disabling traitor receivers.

To recap, the term "tracing traitors" is used in the cryptographic literature to describe the problem of determining who released an unauthorized copy of a piece of content, which in practical terms also means without having to give every individual a uniquely marked copy. Instead, the content owner creates different variations at certain points in the content. These variations are differently encrypted and differently marked, but are typically otherwise equivalent. For each segment, the user (or receiver device) is given only a single key for a single variation. No user is given exactly the same set of segments. From the segments used in the unauthorized copy, it is possible to determine which user was given the copy. The real difficulty arises when the users collude and produce a copy that contains segments combined from more than one user. In the literature this colluding group is called a coalition.

Historically, there have been many ways of assigning the segment variations to the users, termed the encoding problem, including a past invention ('395) from the current inventors. However, to date all known methods have tried to detect the guilty parties in the same way: each user is scored based on how many variations they have in common with the recovered content, and the one with the largest score is most likely guilty. In other words, the traditional definition of success in the tracing traitors problem is defined as finding a single member of a guilty coalition.

This is a reasonable definition, but another definition immediately suggests itself: shouldn't the problem really be to find every member of the coalition that produced a pirated file? Although this second definition seems more useful, the first definition has some apparent advantages:

It seems easier.
  The number of coalitions is exponential compared to the number of individuals. For example, if there are a billion participants in the world, there are roughly 500 million billion pairs of participants.
  It seems essential against the "scapegoat" strategy, in which the coalition sacrifices a few devices and uses them heavily while using the others lightly, to keep some in reserve. Note that even without the scapegoat strategy, simulation results usually show some unlucky innocent devices are by chance intermixed with guilty players when the devices are scored in the standard way.

It turns out that fifteen years of tracing traitors intuition is wrong. The present invention thus takes a different and original approach to the redefined detection problem: go after the entire coalition instead of an individual. It is actually easier to find the entire coalition then to find a single member. Yes, the problem is exponential, but with the algorithm described below the calculation time is still reasonable. Attackers using the scapegoat strategy can be addressed by evaluating the confidence in individual members in the purported coalition after a coalition has been found.

The present invention works with any way of assigning the segments, including but not limited to the scheme for producing file modifications with a two-level code for broadcast encryption described for the '395 invention.

Simulations indicate the present invention is roughly three to ten times better than the approach used in the state of the art in terms of successful detection.

The problem of finding a coalition of players that covers a sequence of files is equivalent to a well-known problem in computer science called Set Cover. It is "NP-hard", meaning that all known algorithms are exponential, and it is unlikely non-exponential algorithms exist. All Set Cover algorithms are within the scope of this invention, but we give an example below.

Referring now to FIG. 8, a procedure is shown, according to an embodiment of the present invention. Assume a licensing agency has observed a sequence of recovered files (e.g. movies) and determined the particular variation (the "symbol") in use for each. We also introduce the parameter k, the number of symbols that would uniquely identify a single player. In our previous ('395) invention, k was a fixed number, but this algorithm works equally well in other tracing traitors encoding methods where k is probabilistic. In the probabilistic case, for example, k could be set to $\log_q N$, where N is the total number of players. The following recursive procedure, termed COVER, if given a suspected number of traitors T and a list of encoded symbols discovered, returns true if and only if the there is at least one coalition of size T that can explain the observed symbols; otherwise it returns false:

1. If T*k is greater than the number of symbols, print "many" and return true.
2. Calculate the minimum number of symbols that the largest-scoring traitor must have:

$$\text{min}=\text{ceiling}((\text{length}(\text{symbols})/T)$$

3. For each possible combination of k symbols, calculate whether the single player assigned to that combination covers 'min' number of symbols. If it does, perform the following:
   a. If T=1, print the player ID and return true.
   b. If T>1, recursively call COVER passing the symbol list after removing all the symbols from the suspect player and with T=T−1.
      i. If the recursive call returns false, continue to loop through the other combinations.
      ii. If the recursive call returns true, print the player ID and return true.
   c. If all combinations have been checked, return false.

Referring now to FIG. 9, the main method of the invention is shown, which employs the procedure COVER (or, alternatively, any other Set Cover procedure) as follows:
1. Set T=1.
2. Run COVER.
3. If COVER returns true, exit.
4. Otherwise set T=T+1 and loop to step 2.

Eventually the procedure must exit at step 3. Why? Once the number of movies is less than T*k, COVER is guaranteed to return true (see step 1 in COVER). But the interesting case occurs upon exiting "early". In this case, you have found a coalition, and it is unlikely that a random sequence of movies (or a larger coalition) could have been covered by a coalition of size T. To determine whether or not you are early, the relevant formula is:

$$\text{numcombs} = \text{COMBIN}(N,T)*(T/q)*m \qquad \text{Eqn. 1}$$

In this formula the function COMBIN(N, T) is the number of different combinations of T players in the total population of N players, also called "N take T". Here q is the number of different symbols in each movie, and m is the number of movies recovered. The value of this calculation is an upper bound on the probability that a coalition greater than T in size, encoding m movies, could incriminate a completely innocent coalition of size T. Thus, if this probability is low, and in the absence of any other information about the size of the coalition, the licensing agency is justified in concluding that the guilty players include at least some of the players printed out by the COVER procedure.

What is the chance that some of the players in the purported coalition of size T might be actually innocent, e.g. victimized by a scapegoat strategy that is hiding a few lightly used guilty players? We calculate this as follows (also shown in FIG. 10):
1. For each combination of T players, perform the following steps:
   a. Temporarily assume that the players in the particular combination are guilty.
   b. Set T'=T−(number of players in this combination).
   c. Temporarily subtract from the list of movies all the movies that can be explained by this combination of players, producing a new m.
   d. Use the formula for numcombs above using a new m and T', to evaluate the probability that the remaining players are completely innocent. If the formula yields a number greater than 1, assume the probability is 1.

When this procedure has ended, there will be a list of all possible combinations of players together with the chance that the remaining players are innocent. If some of these combinations indicate that there is a good chance that a player is innocent under those circumstances, the licensing agency would be well advised not to take action against the player (yet). On the other hand, some players will seem guilty under all combinations. In other words, the license agency can use the minimum guilt probability of each player under all combinations as the probability of guilt of the player. In general, players that score higher in terms of the number of movies they could have encoded are also more likely to show up as guilty after the procedure. It is also reassuring that after this procedure any player that is identified only as "many" in the COVER procedure will show up as likely innocent.

Note it is possible that two of the players in the coalition may have a high overlap in movies. In this case, the procedure above might reveal that if player A is guilty, there is a good chance that player B is innocent, and vice versa. In this case, the licensing agency would be well advised to avoid making a decision about either of them until more movies have pointed to one or the other. Note that using the "min" probability rule described above, both players show up as likely innocent for the time being.

However, the particular policy used by the licensing agency is outside of the scope of this invention. This invention provides the necessary tool to the licensing agency: a short list of potentially guilty players and probability of their actual innocence.

We now discuss a few optimizations. Before calling COVER the first time, it is usually faster to pre-calculate the "m take k" potential players. Then, in step 3 of COVER, one simply iterates through the pre-calculated list, seeing if each player is still a candidate under the current circumstances.

Determining which player corresponds to particular list of k symbols can often be optimized. It is always possible to exhaustively search through all the players to see which one is indicated, but this can be obviously sped up by well-known techniques like table look-up and hashing. These techniques are within the scope of this invention. Furthermore, if the encoding method used is a linear code, as it was in our previous ('395) invention, it is possible to identify the player by algebraic means. For example, each list of k symbols defines k equations in k unknowns, which can be solved by Gaussian elimination. All such algebraic means are within the scope of this invention. Also, although the invention is described in terms of an incremental increase in candidate coalition size, the invention may also start with a large candidate coalition size and then employ an incremental decrease in that candidate coalition size. Similarly, a random initial candidate coalition size may be used by the invention, with possibly random changes made to the candidate coalition size thereafter to find coalitions in a more roundabout way.

Finally, as our previous ('395) invention has proven, it is often an excellent idea to encode movies in a two-level code, an inner code and an outer code. The inner code is used within a single movie and provides the "symbol" or variation for the outer code, which is used for a sequence of movies. In this circumstance, we apply our present invention first against the inner code in a single movie, then use the result from that to determine the coalition in the outer code. The result from a single movie is then a "coalition" of symbols in the outer code, together with a confidence whether these symbols are "guilty". After discarding the low-confidence symbols, if there is more than one symbol with high confidence, we simply treat this as if we had recovered more than one movie. Of course, the "k take m" combination logic to find players has to be slightly modified, because no single player can have more than one symbol from a single movie. This only serves to reduce the number of combinations, which speeds up the process.

In fact, much to our surprise, the strategy of mixing segments within a single movie seems to be a very bad one from the point of view of the attackers, at least for a reasonable number of attackers. For example, if q=256 and there are 1 billion players, it takes 22 recovered movies before the licensing agency has a less than 1/10000 chance of incriminating an innocent player out of a coalition of four players, as long as the attackers are using the movie-by-movie strategy. If the attackers are mixing and matching, it takes only 7 movies to achieve the same confidence. Prior to this invention, we had concluded that the best strategy for the attackers was always mix-and-match, and finding guilty party out of a coalition of four even after 255 movies was not a certainty.

A general purpose computer is programmed according to the inventive steps herein. The invention can also be embodied as an article of manufacture—a machine component—that is used by a digital processing apparatus to execute the present logic. This invention is realized in a critical machine component that causes a digital processing apparatus to perform the inventive method steps herein. The invention may be embodied by a computer program that is executed by a processor within a computer as a series of computer-executable instructions. These instructions may reside, for example, in RAM of a computer or on a hard drive or optical drive of the computer, or the instructions may be stored on a DASD array, magnetic tape, electronic read-only memory, or other appropriate data storage device.

While the invention has been described with respect to illustrative embodiments thereof, it will be understood that various changes may be made in the apparatus and means herein described without departing from the scope and teaching of the invention. Accordingly, the described embodiment is to be considered merely exemplary and the invention is not to be limited except as specified in the attached claims.

We claim:

1. A method for tracing traitors in a broadcast encryption system, comprising:
   (a) constructing candidate coalitions of potential traitors having a size of T, wherein T is at least two;
   (b) determining if any of the candidate coalitions cover variations observed in a pirated file; and
   (c) if a candidate coalition covers variations observed in the pirated file, identifying the candidate coalition as having at least one traitor, wherein said identifying comprises:
      computing a minimum number of k file variations that would uniquely identify a single receiver, wherein if the product of k and coalition size T is greater than the number of variations then returning an indication that many satisfactory coalitions exist (true result),
      calculating a minimum number of variations that the most probable traitor has by applying the ceiling function to:
      a length of variations divided by T, and
      for each combination of k possible variations, if a particular receiver assigned to that combination covers the min variations then:
         (i) if the candidate coalition size T is one, then identify the particular receiver and exit (true result),
         (ii) if coalition size T is greater than one then remove all the covered variations from the particular receiver, decrease the candidate coalition size T by one, and recursively perform said determining on the remaining variations, and selectively:
            (1) continue if said determining checks all combinations (false result), and
            (2) identify the particular receiver and exit (true result) if said determining finds a satisfactory coalition (true result), and
         (iii) if all combinations have been checked then exit (false result).

2. The method of claim 1, wherein if a candidate coalition does not cover variations observed in the pirated file, performing (a), (b), and (c) for a candidate coalition (of potential traitors) having a size of T+1.

3. The method of claim 2, comprising iteratively performing (a), (b), and (c) by increasing the candidate coalition size by one until a candidate coalition is found that covers variations observed in the pirated file, and then identifying said found candidate coalition as having at least one traitor.

4. The method of claim 1, wherein said determining employs a set cover algorithm.

5. The method of claim 1, wherein the number of variations that would uniquely identify a traitor is known only probabilistically.

6. The method of claim 1, wherein the variations use a two-level code, the two-level code comprising an inner code used within a single file and an outer code used for a sequence of files.

7. The method of claim 1, wherein the pirated files include at least one of: a cryptographic key, text, audio, an image, a multimedia presentation, music, a movie, an operating system, a video game, and a software application.

8. The method of claim 1, wherein the broadcast encryption system distributes the pirated files by at least one of: computer networks, satellite networks, cable networks, television transmission, and physical storage media.

9. The method of claim 1, wherein said identifying minimizes a probability of falsely concluding an innocent receiver is traitorous.

10. The method of claim 1, comprising:
    selectively revoking the at least one traitor.

11. The method of claim 1, comprising:
    determining whether a candidate coalition of potential traitors having a size of T would explain particular variations employed in the observed pirated file with greater than a predetermined probability that an innocent candidate coalition of size T is falsely incriminated by chance;
    changing the candidate coalition size value T and repeating said determining whether a candidate coalition of potential traitors having a size of T would explain particular variations employed in the observed pirated file until one of these conditions is met:
       (a) a satisfactory candidate coalition of potential traitors is found (true result), and
       (b) all combinations of variations observed in a pirated file that would uniquely identify a single receiver are checked (false result); and
    outputting a list of probable traitors in any satisfactory candidate coalition and computed statistical probabilities of their guilt.

12. The method of claim 1, wherein the probability that an innocent candidate coalition of size T is falsely incriminated by chance is determined for each candidate coalition of potential traitors by:
    temporarily assuming that a particular combination of receivers are guilty;
    defining T' as T minus the number of receivers in the particular combination;
    defining m' as the number of recovered files m minus the number of files that can be explained by the particular combination; and
    computing a probability that remaining receivers are innocent as $COMBIN(N, T')*(T/q)*m'$, where N is the total population of receivers and q is the number of different symbols in each recovered file.

13. A computer program product for tracing traitors in a broadcast encryption system, the computer program product comprising a non-transitory computer readable storage medium having computer readable program code embodied therewith, the computer readable program code comprising computer readable program code configured to:
   (a) construct candidate coalitions of potential traitors having a size of T, wherein T is at least two;
   (b) determine if any of the candidate coalitions cover variations observed in a pirated file; and
   (c) identify the candidate coalition as having at least one traitor, if a candidate coalition covers variations observed in the pirated file, wherein said identify comprises:
      compute a minimum number of k file variations that would uniquely identify a single receiver, wherein if the product of k and coalition size T is greater than the number of variations then returning an indication that many satisfactory coalitions exist (true result),
      calculating a minimum number of variations that the most probable traitor has by applying the ceiling function to: a length of variations divided by T, and
      for each combination of k possible variations, if a particular receiver assigned to that combination covers the min variations then:
         (i) if the candidate coalition size T is one, then identify the particular receiver and exit (true result), (ii) if coalition size T is greater than one then remove all the covered variations from the particular receiver, decrease the candidate coalition size T by one, and recursively perform said determine on the remaining variations, and selectively:
  (1) continue if said determining checks all combinations (false result), and
  (2) identify the particular receiver and exit (true result) if said determining finds a satisfactory coalition (true result), and
(iii) if all combinations have been checked then exit (false result).

14. The computer program product of claim 13, wherein if a candidate coalition does not cover variations observed in the pirated file, perform (a), (b), and (c) for a candidate coalition (of potential traitors) having a size of T+1.

15. The computer program product of claim 14, comprising:
iteratively perform (a), (b), and (c) by increasing the candidate coalition size by one until a candidate coalition is found that covers variations observed in the pirated file, and then identifying said found candidate coalition as having at least one traitor.

16. The computer program product of claim 13, wherein said determine employs a set cover algorithm.

17. The computer program product of claim 13, wherein the number of variations that would uniquely identify a traitor is known only probabilistically.

18. The computer program product of claim 13, wherein the variations use a two-level code, the two-level code comprising an inner code used within a single file and an outer code used for a sequence of files.

19. The computer program product of claim 13, wherein the pirated files include at least one of: a cryptographic key, text, audio, an image, a multimedia presentation, music, a movie, an operating system, a video game, and a software application.

20. The computer program product of claim 13, wherein the broadcast encryption system distributes the pirated files by at least one of: computer networks, satellite networks, cable networks, television transmission, and physical storage media.

21. The computer program product of claim 13, wherein said identify minimizes a probability of falsely concluding an innocent receiver is traitorous.

22. The computer program product of claim 13, comprising:
selectively revoke the at least one traitor.

23. The computer program product of claim 13, comprising:
determining whether a candidate coalition of potential traitors having a size of T would explain particular variations employed in the observed pirated file with greater than a predetermined probability that an innocent candidate coalition of size T is falsely incriminated by chance;
change the candidate coalition size value T and repeating said determine whether a candidate coalition of potential traitors having a size of T would explain particular variations employed in the observed pirated file until one of these conditions is met:
  (a) a satisfactory candidate coalition of potential traitors is found (true result), and
  (b) all combinations of variations observed in a pirated file that would uniquely identify a single receiver are checked (false result); and
output a list of probable traitors in any satisfactory candidate coalition and computed statistical probabilities of their guilt.

24. The computer program product of claim 13, wherein the probability that an innocent candidate coalition of size T is falsely incriminated by chance is determined for each candidate coalition of potential traitors by:
temporarily assume that a particular combination of receivers are guilty;
define T' as T minus the number of receivers in the particular combination;
define m' as the number of recovered files m minus the number of files that can be explained by the particular combination; and
compute a probability that remaining receivers are innocent as COMBIN(N, T')*(T/q)*m', where N is the total population of receivers and q is the number of different symbols in each recovered file.

25. A system for tracing traitors, comprising:
a digital processing apparatus that:
  (a) constructs candidate coalitions of potential traitors having a size of T, wherein T is at least two;
  (b) determines if any of the candidate coalitions cover variations observed in a pirated file; and
  (c) if a candidate coalition covers variations observed in the pirated file, identifies the candidate coalition as having at least one traitor, wherein said identify comprises:
    compute a minimum number of k file variations that would uniquely identify a single receiver, wherein if the product of k and coalition size T is greater than the number of variations then returning an indication that many satisfactory coalitions exist (true result),
    calculating a minimum number of variations that the most probable traitor has by applying the ceiling function to: a length of variations divided by T, and
    for each combination of k possible variations, if a particular receiver assigned to that combination covers the min variations then:
      (i) if the candidate coalition size T is one, then identify the particular receiver and exit (true result),
      (ii) if coalition size T is greater than one then remove all the covered variations from the particular receiver, decrease the candidate coalition size T by one, and recursively perform said determine on the remaining variations, and selectively:
        (1) continue if said determining checks all combinations (false result), and
        (2) identify the particular receiver and exit (true result) if said determining finds a satisfactory coalition (true result), and
      (ii) if all combinations have been checked then exit (false result).

26. The system of claim 25, wherein if a candidate coalition does not cover variations observed in the pirated file, the digital processing apparatus performs (a), (b), and (c) for a candidate coalition (of potential traitors) having a size of T+1.

27. The system of claim 26, wherein the digital processing apparatus iteratively performs (a), (b), and (c) by increasing the candidate coalition size by one until a candidate coalition is found that covers variations observed in the pirated file, and then identifies said found candidate coalition as having at least one traitor.

28. The system of claim 25 wherein the pirated files include at least one of: a cryptographic key, text, audio, an image, a multimedia presentation, music, a movie, an operating system, a video game, and a software application.

29. The system of claim 25, wherein said identifies includes minimizing a probability of falsely concluding an innocent receiver is traitorous.

30. The system of claim 25, wherein the digital processing apparatus selectively revokes the at least one traitor.

* * * * *